(12) United States Patent
Hellweg et al.

(10) Patent No.: US 6,463,974 B1
(45) Date of Patent: Oct. 15, 2002

(54) VEHICLE WHEEL WITH AN EMERGENCY RUNNING SUPPORT BODY

(75) Inventors: Hans-Bernd Hellweg, Seelze (DE); Michael Glinz, Neustadt (DE)

(73) Assignee: Continental Aktiengesellschaft, Hannover (DE)

(*) Notice: Subject to any disclaimer, the term of this patent is extended or adjusted under 35 U.S.C. 154(b) by 0 days.

(21) Appl. No.: 09/744,952

(22) PCT Filed: May 28, 1999

(86) PCT No.: PCT/EP99/03724

§ 371 (c)(1),
(2), (4) Date: Oct. 1, 2001

(87) PCT Pub. No.: WO99/64260

PCT Pub. Date: Dec. 16, 1999

(30) Foreign Application Priority Data

Jun. 5, 1998 (DE) .......................... 198 25 311

(51) Int. Cl.[7] .............................................. B60C 17/06
(52) U.S. Cl. ..................................... 152/400; 152/520
(58) Field of Search .............................. 152/516, 520, 152/381.5, 399, 400, 401

(56) References Cited

U.S. PATENT DOCUMENTS

| 4,046,182 A | * | 9/1977 | Farnsworth | ................. 152/516 |
| 4,177,849 A | | 12/1979 | Osada et al. | |
| 4,263,953 A | * | 4/1981 | Miceli | ................. 152/400 X |
| 4,674,549 A | * | 6/1987 | Bush | ................. 152/520 X |
| 4,681,147 A | | 7/1987 | Hugele | |
| 5,435,363 A | * | 7/1995 | Pender | ................. 152/520 X |

FOREIGN PATENT DOCUMENTS

| CA | 1266813 | 3/1990 |
| DE | 3507045 | 8/1986 |
| FR | 2579527 | 10/1986 |

* cited by examiner

Primary Examiner—Russell D. Stormer
(74) Attorney, Agent, or Firm—Greenblum & Bernstein, P.L.C.

(57) ABSTRACT

Vehicle wheel including a wheel rim and pneumatic tire having a tread, two side walls and two beads, is mounted to the wheel rim. An emergency running support body is arranged within the pneumatic tire. The emergency running support body comprises a ring-shaped body. The ring-shaped body comprises a first axial outer wall region, a second axial outer wall region, and an emergency running support surface adapted to support the pneumatic tire in an emergency running condition. A first ring-shaped support element is arranged to support the first axial outer wall region. A second ring-shaped support element is arranged to support the second axial outer wall region. At least one of the first and the second ring-shaped support elements comprises a multi-layered structure.

34 Claims, 6 Drawing Sheets

VEHICLE WHEEL WITH AN EMERGENCY RUNNING SUPPORT BODY

CROSS-REFERENCE TO RELATED APPLICATIONS

The present application is a National Stage Application of International Application No. PCT/EP99/03724, filed May 28, 1999. Further, the present application claims priority under 35 U.S.C. § 119 of German Patent Application No. 198 25 311.7 filed on Jun. 5, 1998.

BACKGROUND OF THE INVENTION

1. Field of the Invention

The invention relates to a vehicle wheel with an emergency running support body for a pneumatic tire attached to a wheel rim, having essentially a tread, two side walls, a carcass, reinforcing elements, and two tire beads provided with bead cores, with the emergency running support body being embodied as a shell-shaped ring body inside the pneumatic tire, which has an emergency running surface that supports the tire in case of damage and is supported on the wheel rim with its two axially outer wall regions by way of ring-shaped support elements, with the support elements having different elasticities in the radial and axial stressing directions.

2. Discussion of Background Information

A wheel provided with an emergency running support body is disclosed in DE-OS 35 07 046, with the emergency running body shown therein consisting of an outer metallic reinforcement ring and a padding ring arranged between the reinforcement ring and the rim. In such a wheel, it is necessary for the emergency running support body and the wheel to be placed on the rim in an extensive mounting in which the emergency running body and the reinforcement ring must be carefully fixed in the rim drop center. Disadvantageously, a mounting that can be performed in an appropriate amount of time and without great expense is not possible with this system.

U.S. Pat No. 3,610,308 discloses a tire capable of emergency running in which the tire beads extend to the inner side of the tire and are embodied as emergency running bodies on which the underside of the tire tread can rest. However, due to the relatively small contact surface that is available for the contact with the tread during emergency running, such a construction of an emergency running body necessitates a heavy stressing and a premature wearing of the rubber parts rubbing and/or sliding against one another. Moreover, the tire beads embodied as emergency running bodies can be displaced into the rim drop center and thus can contribute to peeling of the tire.

The disadvantage of such a peeling under emergency running conditions is somewhat reduced by a solution such as is disclosed in DE-AS 10 22 483, in which, under the tread on the surface facing the hollow chamber of the tire, projections are arranged that produce a connection between the tread and the emergency running rings formed on the tire beads that is effective in the case of crosswise forces. The production of such a tire provided with projections is relatively expensive and, moreover, the production of tires with emergency running support bodies must be deliberately planned as a deviation from the normal production process.

In most emergency running support bodies for standard rims, there is the additional problem that the emergency running support body, on the one hand, if possible, must not hinder the pulling of the tire onto the rim during mounting, i.e., the entry of the tire bead into the drop center, and thus should be flexible and, on the other hand, must remain as stable in its form as possible during emergency running conditions. Until now, these opposing requirements could only be taken into account using holders, distance maintainers, etc. applied in addition to the emergency running support body.

SUMMARY OF THE INVENTION

The invention therefore provides for a vehicle wheel with an emergency running support body to be provided with a pneumatic tire, which can be mounted easily and without special expense on conventional drop center rims (standard rims) as well, which, under emergency running conditions, maintains a secure driving behavior and a rolling that is sufficiently stable in its form, which can transfer lateral guidance forces without an excessive increase in weight and securely counteracts peeling of the tire, and which flexibly allows the combination with preexisting types of tires and tire confections, including retroactive combination, such that separate production and logistics must not necessarily be reserved.

The invention provides for a vehicle wheel comprising a wheel rim. A pneumatic tire having a tread, two side walls and two beads, is mounted to the wheel rim. An emergency running support body is arranged within the pneumatic tire. The emergency running support body comprises a ring-shaped body. The ring-shaped body comprises a first axial outer wall region, a second axial outer wall region, and an emergency running support surface adapted to support the pneumatic tire in an emergency running condition. A first ring-shaped support element is arranged to support the first axial outer wall region. A second ring-shaped support element is arranged to support the second axial outer wall region. At least one of the first and the second ring-shaped support elements comprises a multi-layered structure.

The emergency running support body may be shell-shaped. Each of the first and the second ring-shaped support elements may comprise a multi-layered structure. At least one of the first and the second ring-shaped support elements may comprise at least three layers. At least one of the first and the second ring-shaped support elements may comprise at least four layers. At least one of the first and the second ring-shaped support elements may comprise at least one layer of one material and at least another layer of another different material. At least one of the first and the second ring-shaped support elements may comprise at least one layer having an elasticity and at least another layer having a different elasticity.

The multi-layered structure may comprise at least two layers connected to each other. The first ring-shaped support element may be connected to the first axial outer wall region and the second ring-shaped support element may be connected to the second axial outer wall region. The emergency running support surface may be disposed between the first axial outer wall region and the second axial outer wall region. The ring-shaped body may be slotted. The ring-shaped body may comprise a slot which is essentially axially oriented. The ring-shaped body may comprise a separating slot.

At least one layer of the multi-layered structure may comprise an upper layer and at least another layer of the multi-layered structure may comprise a lower layer, whereby the upper layer has a lower elasticity than the lower layer. At least one of layer of the multi-layered structure may comprise an upper layer, at least another layer of the multi-layered structure may comprise a middle layer, and at least another layer of the multi-layered structure may comprise a lower layer, whereby the middle layer is arranged between the upper layer and the lower layer and whereby the upper layer has a lower elasticity than both the middle layer and the lower layer. The upper layer of the multi-layered structure may be connected to the first axial outer wall region and the lower layer may engage a surface of the wheel rim. The upper layer of the multi-layered structure may be connected to the second axial outer wall region and the lower layer may engage a surface of the wheel rim.

At least one layer of the multi-layered structure comprises an upper layer, at least another layer of the multi-layered structure may comprise a middle layer, and at least another layer of the multi-layered structure may comprise a lower layer, whereby the middle layer is arranged between the upper layer and the lower layer and whereby each of the upper layer and the lower layer have a greater elasticity than the middle layer. The upper layer of the multi-layered structure may be connected to the first axial outer wall region and wherein the lower layer engages a surface of the wheel rim. The upper layer of the multi-layered structure may be connected to the second axial outer wall region and wherein the lower layer engages a surface of the wheel rim.

At least one of the first ring-shaped support element and the second ring-shaped support element may comprise an opening adapted to receive at least a portion of one of the first axial outer wall region and the second axial outer wall region. The opening adapted to receive at least a portion of one of the first axial outer wall region and the second axial outer wall region may comprise at least one of a circumferential opening, an opening having a curved shape, and an opening having a negative profile. The opening adapted to receive at least a portion of one of the first axial outer wall region and the second axial outer wall region may comprise an opening having a negative profile, the negative profile being adapted to receive a positive profile of at least one of the first axial outer wall region and the second axial outer wall region.

The first ring-shaped support element may comprise a first opening adapted to receive at least a portion of the first axial outer wall region and the second ring-shaped support element may comprise a second opening adapted to receive at least a portion of the second axial outer wall region. At least one of the first and the second openings may be at least one of a circumferential opening, a curved-shaped opening, and a negative profile. Each of the first opening and the second opening may have a negative profile, each negative profile being adapted to receive a corresponding positive profile of the first axial outer wall region and the second axial outer wall region.

At least one of the first axial outer wall region and the second axial outer wall region may comprise a receiver, the receiver being adapted to at least partially surround one of the first ring-shaped support element and the second ring-shaped support element. Each of the first axial outer wall region and the second axial outer wall region may comprise a receiver, each receiver being adapted to at least partially surround the first ring-shaped support element and the second ring-shaped support element.

At least one layer of the multi-layered structure may comprise an upper layer and at least another layer of the multi-layered structure may comprise a lower layer, whereby the upper layer has a lower elasticity than the lower layer. At least one layer of the multi-layered structure may comprise an upper layer, at least another layer of the multi-layered structure may comprise a middle layer, and at least another layer of the multi-layered structure may comprise a lower layer, whereby the middle layer is arranged between the upper layer and the lower layer and whereby the upper layer has a lower elasticity than both the middle layer and the lower layer.

The multi-layered structure may comprise at least an upper layer and at least a lower layer, the upper layer including plastic and the lower layer including rubber. The multi-layered structure may comprise at least an upper layer, at least a middle layer, and at least a lower layer, whereby the upper layer and the lower layer includes rubber, and the middle layer includes plastic. The emergency running support body may comprise shell-shaped structure having at least two outwardly curved surfaces and at least one inwardly curved surface arranged therebetween.

The invention also provides for a vehicle wheel comprising a wheel rim. A pneumatic tire having a tread, two side walls and two beads is mounted to the wheel rim. An emergency running support body is arranged within the pneumatic tire. The emergency running support body comprises a ring-shaped body. The ring-shaped body comprises a first axial outer wall region, a second axial outer wall region, and an emergency running support surface adapted to support the pneumatic tire in an emergency running condition. A first ring-shaped support element is arranged to support the first axial outer wall region. A second ring-shaped support element is arranged to support the second axial outer wall region. Each of the first and the second ring-shaped support elements comprises at least two layers having different elasticity.

The invention additionally provides for a vehicle wheel comprising a wheel rim. A pneumatic tire having a tread, two side walls and two beads is mounted to the wheel rim. An emergency running support body is arranged within the pneumatic tire. The emergency running support body comprises a ring-shaped body. The ring-shaped body comprises a first axial outer wall region, a second axial outer wall region, and an emergency running support surface adapted to support the pneumatic tire in an emergency running condition. A first ring-shaped support element is arranged to support the first axial outer wall region. A second ring-shaped support element is arranged to support the second axial outer wall region. Each of the first and the second ring-shaped support elements comprises at least two layers made of different materials.

According to the invention, the ring-shaped support elements are embodied as bonded bodies which, over the radial height of the support body, utilize several material layers of different elasticity connected to one another.

Such an embodiment of the ring-shaped support elements as bonded bodies allows the provision of a flexibility and elasticity of the support elements that can be adjusted exactly to the necessary characteristics in mounting and under emergency running conditions. By way of the material layers with different elasticity connected to one another, the stability of form of the ring-shaped support elements can, using corresponding layering and gradation of the elasticities of the individual material layers, be laid out in such a way that a different deformability of the support elements is not only present in the radial and axial direction, but also a deformability is provided over the radial height of the support elements that changes in an appropriate manner with the distance from the rim.

In the case of an axial stressing of the support elements, which can occur, on the one hand, during mounting and, on the other hand, under emergency running conditions, here in particular during cornering, a possibility of constructive adaptation to these two substantial cases of axial stressing is provided while, at the same time, the bearing capability in the radial direction during emergency running conditions is not diminished.

Advantageously, the ring body is embodied as a slotted ring body with an opening slot running essentially in the axial direction. From this, a possibility results of a reduction in size of the support elements as well as of the arrangement of all emergency running components near the rim. By embodying the support elements as bonded bodies that are sufficient for the axial stress during mounting and are deformable in a defined manner and by the slot-like embodiment of the ring body, the shell-shaped ring body and its outer wall regions can be produced in diameters that exceed the diameter of the rim flange and/or the rim not at all or only insignificantly.

In mounting, such an embodiment creates the possibility of introducing the ring body into the tire cavity after a tire bead is already fixed on a rim shoulder by an axial deformation of the bonded bodies and a spring-like release of the slotted ring into an increased mounting diameter. After introduction, the shell-shaped ring body and the neighboring support elements then take on their original form with smaller diameters.

Another advantageous embodiment provides that the bonded body contains a radially upper material layer that is connected to the ring body and that has a lower elasticity than the neighboring radially lower material layers.

By utilizing such an embodiment, an increased stability of form is achieved in the regions that are subjected to the greatest bending stress in the case of axial stress and stress transferred by way of the rim, such that an abrupt change in the bending line—in an extreme case, a buckling of the support element—in the region of the connection to the ring body is securely prevented. In this manner, it is also possible to adapt the radially upper part of the bonded body forming the support element to the ring body in its stability of form, whereby an absolutely desirable rigid receiver is formed. With such an embodiment, axial stresses can be transferred to the ring body and, if the ring body is embodied correspondingly, can be absorbed in a springed fashion.

Advantageously, the bonded body contains a bonded packet consisting of at least three material layers, whose radially upper material layer and whose radially lower material layer have a greater elasticity than the material layer(s) lying therebetween.

On the one hand, the above-mentioned rigid or stiffer receiver in the connection region between the ring body and the support element is made possible hereby, which is naturally improved by the above-described arrangement of a material layer connected to the ring body with a low elasticity in comparison with the subsequent radially lower material layers.

On the other hand, the bonded body is also constructed with a lower elasticity and thus a greater stability of form in the radially lower region of the support element, which is arranged near the rim. Especially in the advantageous further development in which the radially lower material layer rests on the rim, such a secure seating on the rim is achieved and a shifting of the support element into the drop center in the case of axial stress under emergency running conditions is securely prevented.

Advantageously, the radially upper material layer, which is connected to the material layer, is connected to the respective axially outer wall region of the ring body in a non-positive manner.

Such a non-positive connection, which is performed, for example, by way of adhesive connection or can be achieved by way of initial vulcanization, has the advantage of being a connection that is simply produced, in particular on a large scale, because it is possible to use a proven connection technique that can be automated. Here, a highly stable connection even under dynamic stress is attainable utilizing the construction of the bonded body using several material layers and their graduated elasticity.

Naturally, depending on the field of application, such a connection can also be embodied as a partially or completely form-fitting connection, for example, by rivets, screws, or catch elements, optionally removable catch elements, where, in addition, the possibility of an exchange of support elements, for example, periodically at each tire change, is made possible.

In a further advantageous embodiment, for the purpose of connecting the axially outer wall region of the ring body as the first part and the radially upper material layer of the bonded body as the second part, either the axially outer wall region of the ring body or the radially upper material layer is provided with a positive profile, where the other part has a complementary negative profile for accepting the positive profile.

This results in not only a simple-to-produce embodiment of a removable connection between the ring body and the support element but also the possibility of producing the bonded body forming the support element as a cable profile, which is provided cut into pieces and is connected to the ring body either before or during the mounting of the emergency running support body.

Especially in the above-mentioned embodiment of the ring body as a slotted ring, after the release of the slotted ring, the support element and ring body can be pushed into one another with their positive and negative profiles. In the same manner, a periodic exchange of the support elements can occur. Likewise, the production process of a more extensive palette of types is simplified overall because, in the case of a defined formation of the positive and negative profile, a standard ring body, for example, can be combined with support elements adapted for different types of tires and vehicles.

If the materials for the positive-negative profile connection are embodied in a correspondingly elastic manner, an optionally removable catch or snapping connection can be formed.

In a further advantageous embodiment, the axially outer wall region of the ring body is provided with a receiver that partially surrounds the upper material layer of the bonded body, with the bonded body having at least three material layers, of which the radially upper material layer, which is partially surrounded by the receiver of the ring body, and the radially lower material layer lying on the rim have a greater elasticity than the material layer(s) lying therebetween.

By way of such a construction, a spring characteristic of the support element is provided that, in the case of increasing radial stresses, progresses in a highly progressive manner up to the blockade of the original elasticity of the upper material layer(s) of the bonded body that is present without stress.

This occurs in that, when the upper material layer, which is partially surrounded by the receiver of the ring body, is structured accordingly, when the bonded body is stressed and the upper material layer is maximally deflected, this material layer is increasingly and, finally, completely surrounded by the rigid receiver of the ring body and, in this deformed state, due to the spring path/spring chamber no longer being available, then becomes a rigid and, in the case of the stress increasing further, a completely nonelastic element.

By correspondingly structuring the depth of the receiver, a partial acceptance of the material layer of the bonded body lying radially further below is also achieved, with the elasticity of this material layer then also being progressively decreased.

Likewise, as the upper material layer of the bonded body dips increasingly into the receiver, the elasticity of the support element follows a highly progressive characteristic, even in the case of axial stress, with axial forces then being increasingly absorbed by the ring body.

Therefore, an emergency running support body is provided with a shell-shaped ring body that supports itself on the wheel rim with its two axially outer wall regions by way of ring-shaped support elements and whose support elements are elastic and deformable in the axial direction in the absence of stress while, in the case on increasing radial stress, the elasticity in the radial and axial direction is increasingly blocked.

The decrease in elasticity in the axial direction under radial stress furthermore has the great advantage that, under emergency running conditions, the increasing axial stability of form of the support elements that are normally resting against the tire bead securely prevents the sliding of the tire beads into the drop center and thus the dreaded detaching of the tire from the rim.

In view of the disadvantages of the prior art emergency running support bodies discussed in the introduction to the description, the emergency running support body according to the invention can be mounted in an ideal manner in an unstressed state while, in the stressed state, the flexibility and elasticity decrease progressively in the desired manner with the magnitude of the stress.

Advantageously, the material layers of higher elasticity utilize rubber and the material layers of lower elasticity utilize plastic. This results in a light and simple to produce construction, where the elasticity can be influenced not only by the form and structure of the material layers in the bonded body, but also in a simple manner, for example, by utilizing different mixtures of rubber or densities (foam weights) of the plastic, within the respective material per se.

In an advantageous further development, the emergency running support body is embodied as a circumferential shell-shaped ring body that has at least two regions that are bowed radially outwardly and are separated from another by at least one radial constriction that supports itself by way of its two axially outer wall regions.

By way of the contour that essentially contains the division of the emergency running surface into two overlying shoulder regions and one more or less pronounced return region, a running behavior with a flat results in connection with the curve form, the bend, and the force absorption and elasticity characteristics of the support element that completely maintains the drivability of the vehicle and differs in handling only slightly from normal running conditions.

Moreover, in the case of such a contour, the radial stresses acting on the ring body under emergency running conditions are concentrated in the shoulder regions lying near the support elements and thus are introduced into the support elements embodied as a bonded body without large lever arms and bowing momentum, which particularly supports the functional manner of the support elements, in particular in a construction of the axially outer wall region of the ring body with a receiver partially surrounding the upper material layer of the bonded body.

In such ring bodies, the ability to absorb lateral guiding forces is also particularly pronounced because, by way of the return provided in the middle regions of the emergency running surface, the middle parts of the tire tread and/or the substructure can move seamlessly into the curvature and thus can produce a form fit that reduces the tensile force acting on the tire sides and thus counteracts a detaching of the tire. Here, the curvature radii are structured with curvature radii constantly transitioning into one another such that, in cooperation with the thickness of the tread of the tire, point or line stresses that could lead to destruction of the tread do not occur.

A further advantage of a shell-shaped ring body with such curvatures resides in that, under emergency running conditions, very high point stresses, such as when driving over the edge of a curb, can be absorbed and an even load distribution occurs that is harmless to the rim with the aid of the increased stiffness due to the formation of the shell-shaped ring body.

Such an emergency running support body, which, as a rule, is produced from material that is inelastic and/or hard in comparison with the support elements, such as steel, aluminum, or reinforced plastic, can be adapted as desired with respect to lateral guidance forces and stresses under emergency running conditions by the selection of materials.

The shell-shaped ring body can additionally be reinforced by way of ribs located on its lower side facing the rim and running in the axial or circumferential direction, which allows absorption of spikes in the stress and a further savings in weight by reducing the wall thickness in regions that are less stressed.

BRIEF DESCRIPTION OF THE DRAWINGS

The invention shall be explained in greater detail with reference to an exemplary embodiment. Shown are.

DETAILED DESCRIPTION OF THE INVENTION

Figure 1:
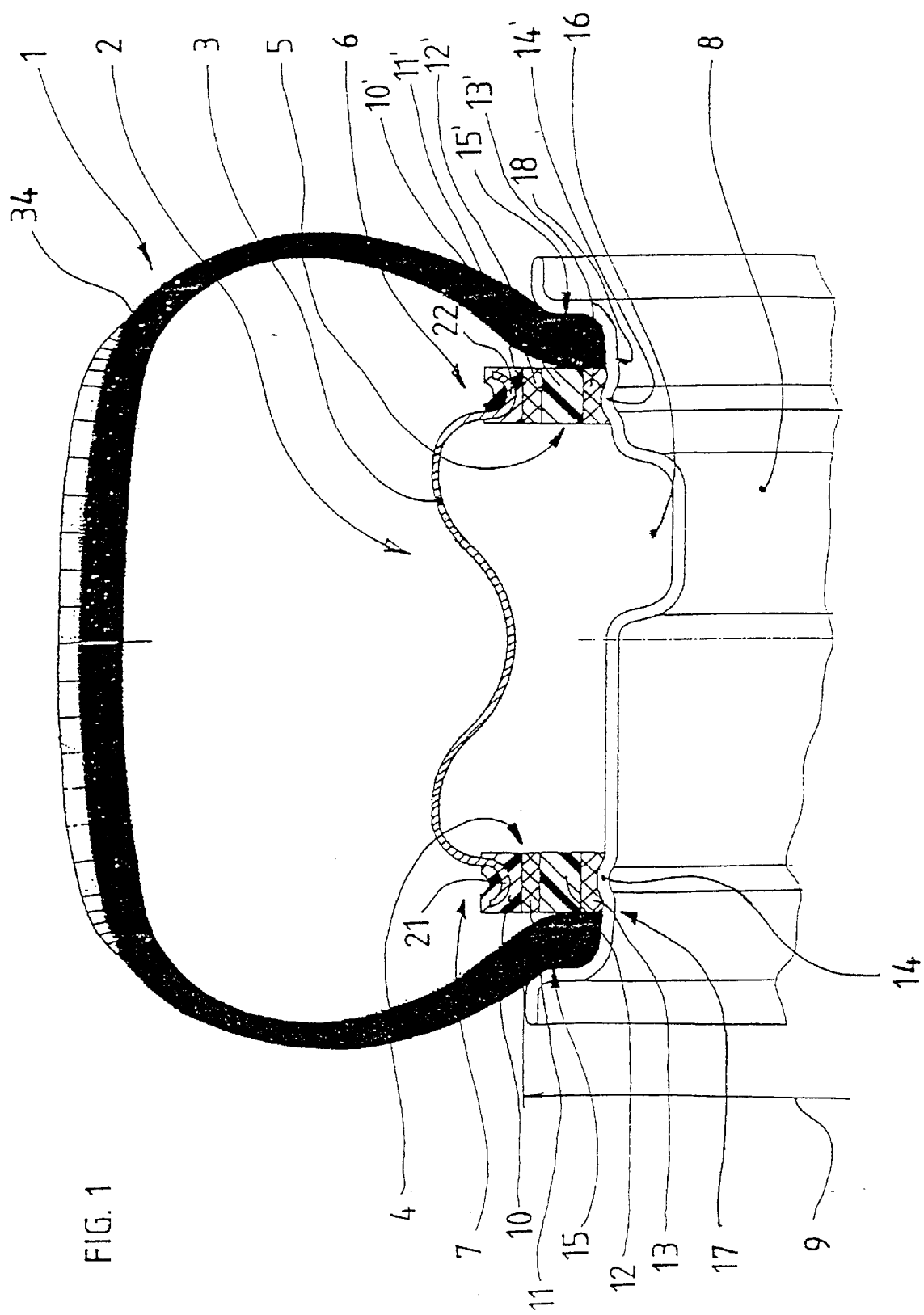
FIG. 1 a vehicle wheel according to the invention with an emergency running support body.

FIG. 1 shows a vehicle wheel 1 that is provided with an emergency running support body 2 that essentially includes a shell-shaped ring body 3 inside the pneumatic tire 34 and the support elements 4 and 5 for the two axially outer wall regions 6 and 7 of the ring body 3. Also visible is a drop center rim 8 conventional in the art with the rim flange diameter 9.

Here, the axially outer wall regions 6 and 7 of the shell-shaped ring body 3 are connected in a form-fitting manner to the applicable ring-shaped support elements 4 and 5.

Here, the support elements 4 and 5 are embodied as bonded bodies that utilize over their radial height of several material layers 10, 11, 12, and 13 as well as 10', 11', 12', and 13' of different elasticity connected to one another.

Here, the two radially upper material layers 10 and 10' are produced from a plastic material that has a substantially lower elasticity than the neighboring radially lower material layers 11 to 13 and 11' to 13'. The bonded bodies 4 and 5 moreover contain a bonded packet utilizing the three material layers 11, 12, 13 and 11', 12', 13' whose radially upper material layers 11 and 11' and whose radially lower material layers 13 and 13' have a higher elasticity than the material layers 12 and 12' lying therebetween.

Here, the material layers 11 and 11' as well as 13 and 13' utilize a rubber mixture while the material layers 12 and 12' utilize a plastic material that has a higher elasticity than the plastic material of the upper layers 10 and 10'.

The lower material layers 13 and 13' rest against the rim, are additionally fixed by the rim hump 14 and 14', and support the tire bead 15 and 15' with their outer sides.

Figure 2:
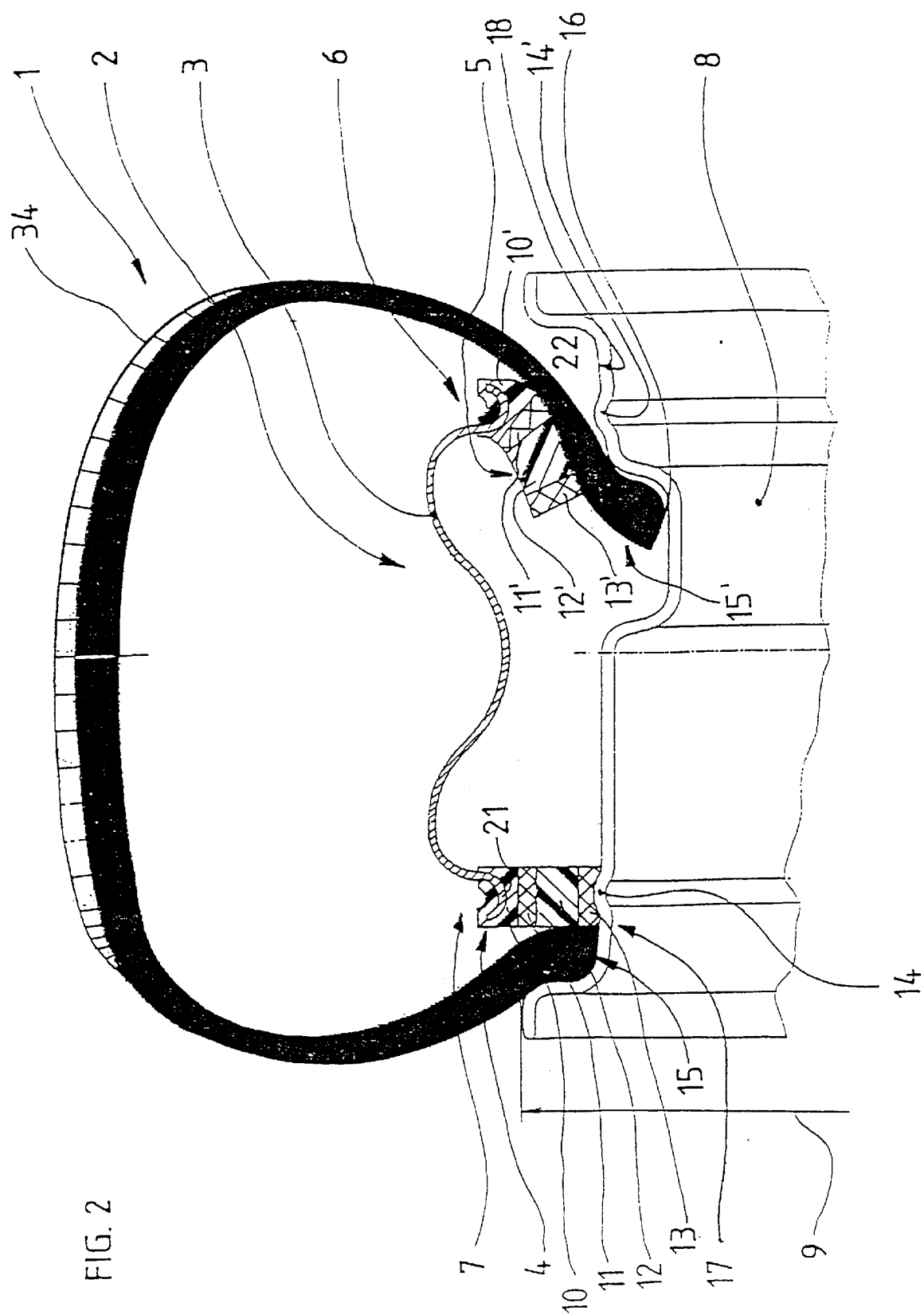
FIG. 2 an intermediate step during mounting of an emergency running support body for a vehicle wheel according to the invention according to FIG. 1.

FIG. 2 shows an intermediate step during mounting of an emergency running support body for a vehicle wheel according to the invention according to FIG. 1. Here, the mounting contains, in order, first the pressing of the tire bead 15 through the drop center 16 into its position on the rim shoulder 17, after which the emergency running support body 2 is first brought into its position and the first support element 4 is pressed into its position supported by the rim hump 14. The next step then provides that the tire bead 15' is pressed into the drop center 16 while deforming the second support element 5 and subsequently being lifted onto the rim shoulder 18, after which the second support element 5 is also sprung back into its position supported by the rim hump 14'.

The ring body 3 can be a slotted ring body with an opening slot 19 running essentially in the axial direction, which is given an enlarged diameter by way of a disc-like expansion of the slotted ring to an enlarged mounting diameter for the purpose of introducing it into the tire cavity and, after having been incorporated, assumes the position near the rim shown here.

Figure 3:
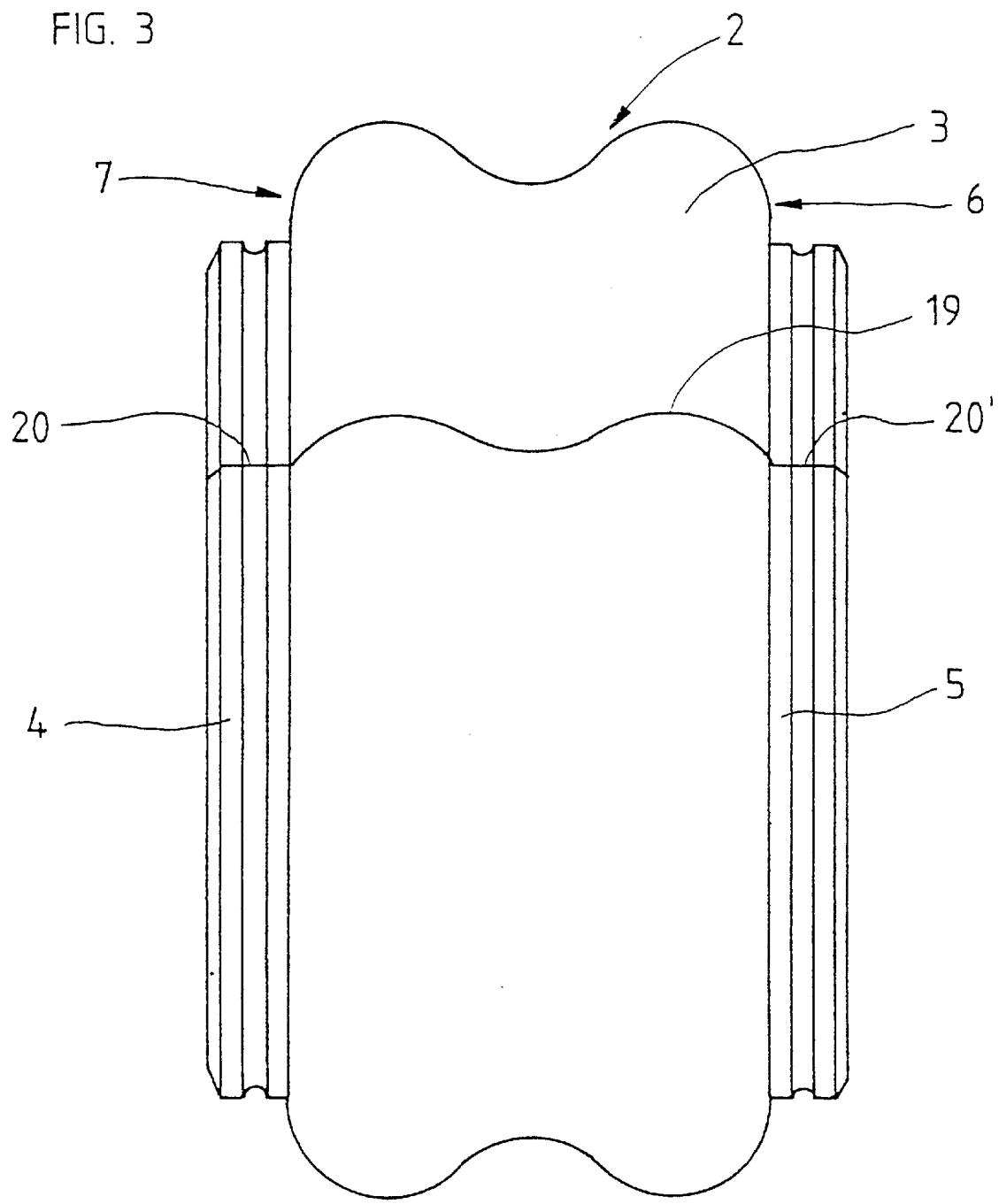
FIG. 3 an emergency running support body embodied as a slotted ring body with inserted support elements in the view.

FIG. 3 shows such an emergency running support body 2 with the opening slot 19 running essentially in the axial direction in the view, where the opening slot 19 can also be arranged in a slightly sloped, bowed, or arrow-shaped manner. FIG. 3 also shows the parting lines 20, 20' of the support elements 4, 5, which are formed as a cable profile that has been cut into pieces.

Here, the axially outer wall regions 6 and 7 of the ring body 3 are provided with arched positive profiles 21 and 22 (see FIG. 1) onto which the support elements 4, 5 are pressed after the opening of the slotted ring with their negative profiles 23 and 24, which are structured in a complimentary manner favorable to incorporating the positive profiles 21 and 22.

Figure 4:
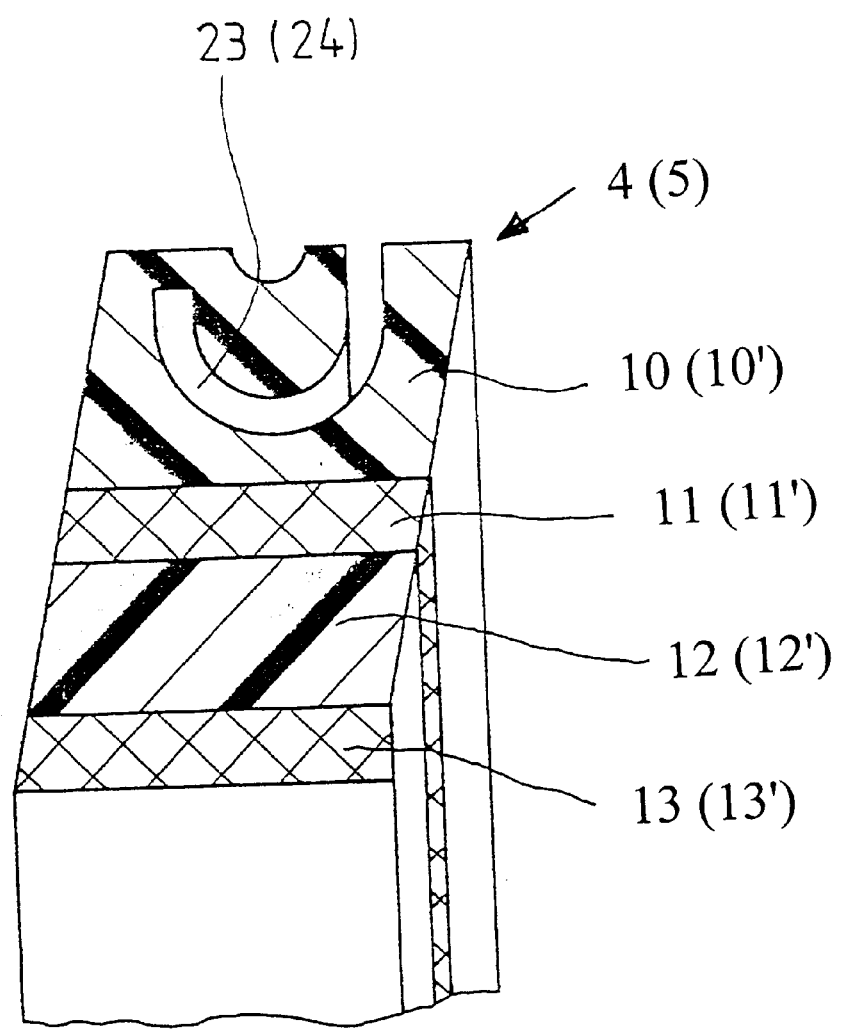
FIG. 4 a support element in a partial section.

FIG. 4 shows by way of example one of the support elements 4 or 5 in a partial section with the material layers 10, 11, 12, and 13 as well as the negative profile 23 (left side) (24 right side). With the cable profile shown here that has been cut into pieces, both support elements can be provided by way of a symmetrical arrangement.

Here, the connection between the axially outer wall regions 6 and 7 of the ring body 3 and the radially upper material layer 10, 10' of the bonded body can additionally be adhered, where the structure of the positive 21, 22 and negative profiles 23, 24 can then be simplified and can be formed more or less solely in the form of an angle of the outer wall regions 6, 7 of the ring body 3 and a corresponding receiver in the upper material layer 10, 10'.

Figure 5:
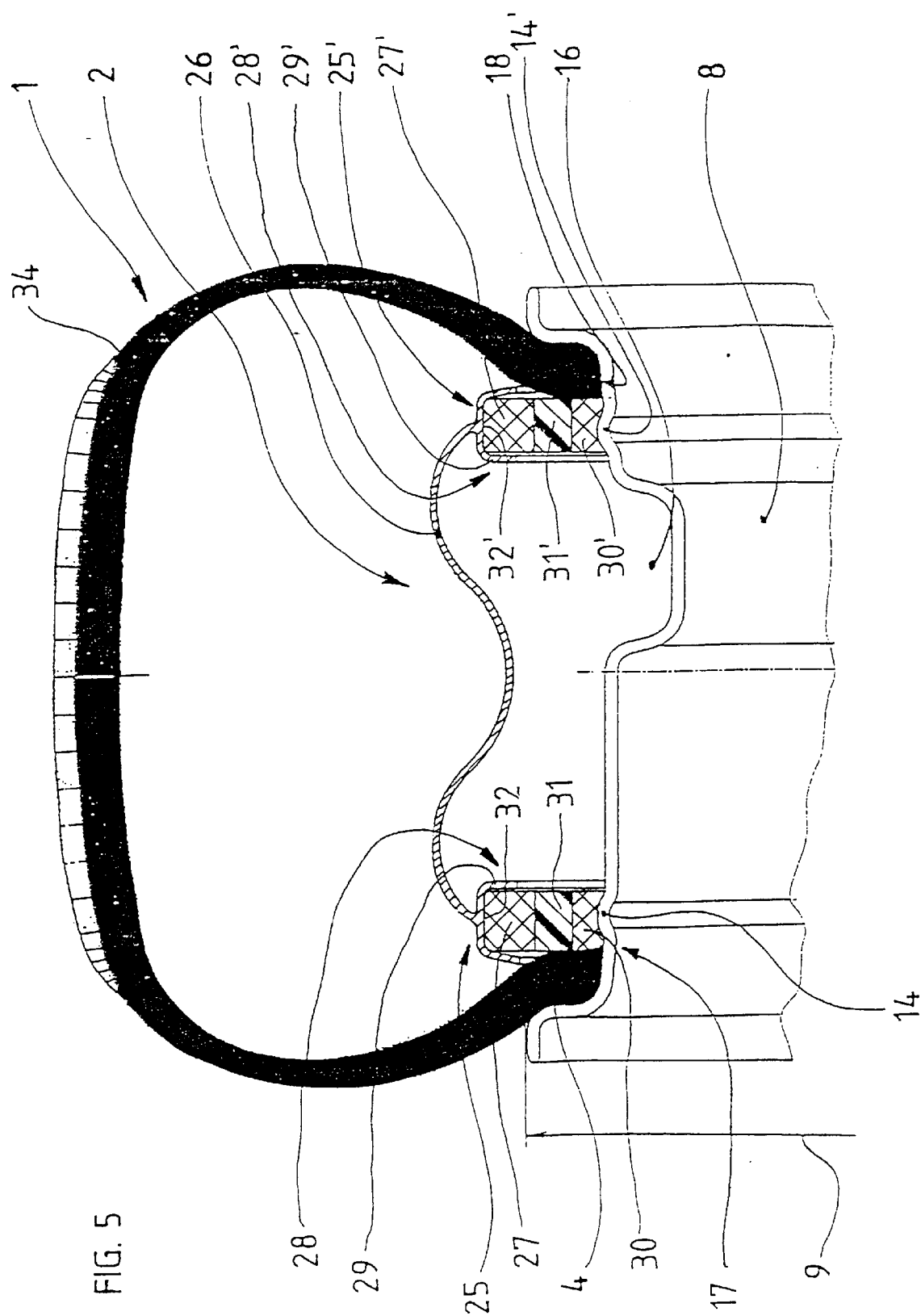
FIG. 5 a vehicle wheel with an emergency running support body in which the axially outer wall regions of the ring body are provided with a receiver partially surrounding the upper material layer of the bonded body.

FIG. 5 shows a vehicle wheel 1 with another embodiment of an emergency running support body 2 in which the outer wall regions 25 and 25' of the ring body 26 are provided with receivers 29 and 29' partially surrounding the upper material layers 27 and 27' of the support elements 28 and 28' that are embodied as bonded bodies.

Here, the radial upper material layers 27 and 27' that are partially surrounded by the receivers 29 and 29' utilize a rubber mixture, just as the radially lower material layers 30 and 30' of the bonded bodies resting on the rim 8. The middle or intermediate material layers 31 and 31' lying between these layers utilize plastic and have a lower elasticity than the material layers 27, 27' and 30, 30'.

Here, the upper material layers 27 and 27' of the bonded bodies are fastened to the ring body 26 in the connection region 32, 32' by way of a cold vulcanization. The connection in this region can also occur by way of non-positive processes, such as gluing or by utilizing a form fit connection, for example, using complimentary profiles or clamping or catching connections.

During mounting, the support elements 28, 28' can be deformed in a similar manner to that of FIG. 2 such that the introduction of the emergency running support body 2 into the tire cavity can occur in a problem-free manner. Under emergency running conditions, i.e., in the case that the inner side of the tread region of the tire 34, which is empty of air, is resting against the ring body 26 and this ring body 26 is therefore loaded with radial forces in a load-bearing manner, the upper material layers 27 and 27' (of the bonded body) dips increasingly into the receivers 29 and 29' of the ring body 26 and are finally completely surrounded by the receivers 29, 29' and are completely blocked from their further flexing in this deformed state.

Figure 6:
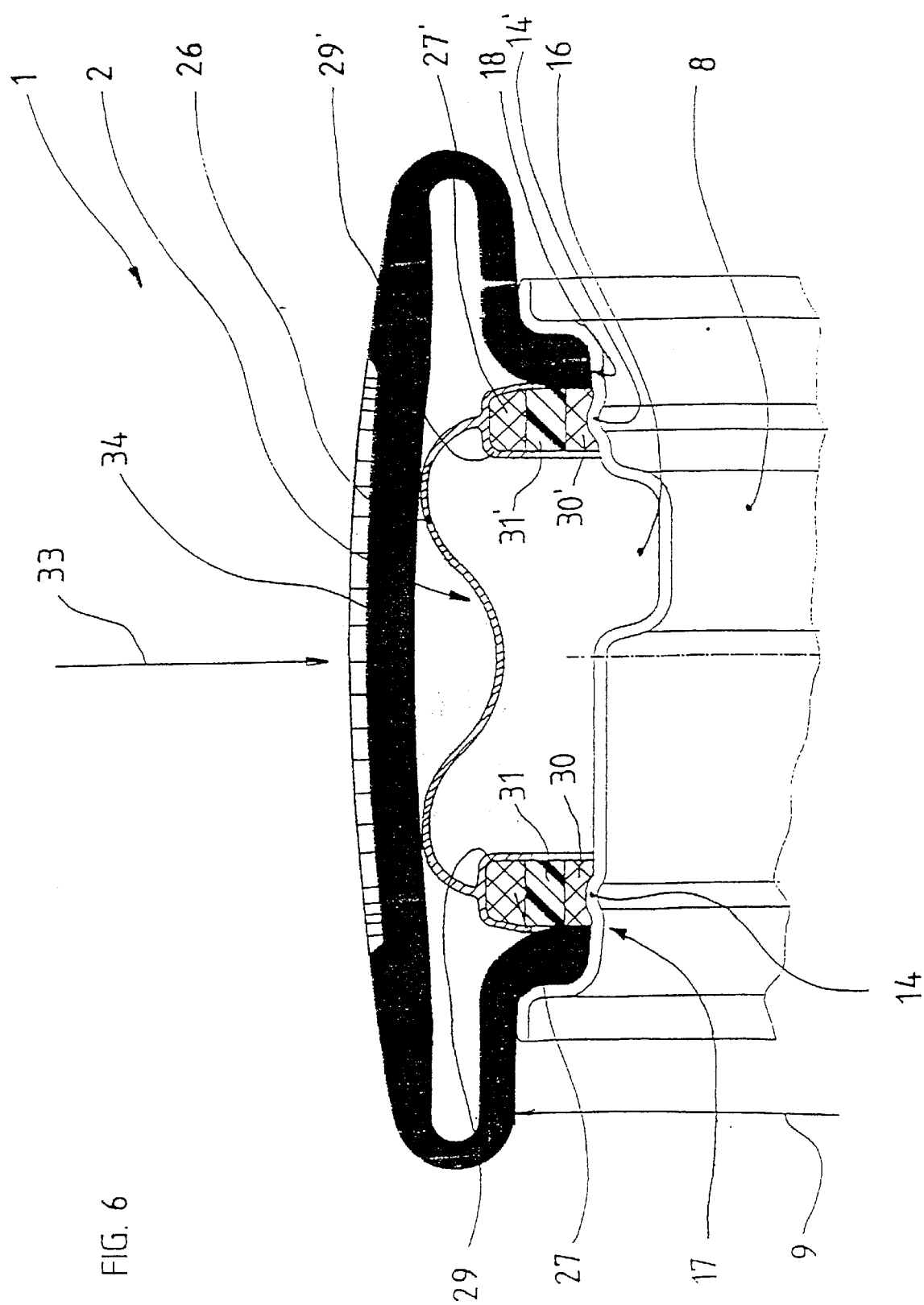
FIG. 6 a vehicle wheel according to FIG. 5 under emergency running stresses.

This is made clearer in FIG. 6, which shows the support element under a radial stressing 33 under emergency running conditions. It is clearly discernible here that the upper material layers 27 and 27' of the bonded bodies have completely dipped into the receivers 29 and 29', whereby these material layers are already completely blocked in their elasticity. According to their elasticity, the middle layers 31 and 31' of the bonded body can also partially dip into the receivers 29 and 29', which middle layers 31, 3 1' are also partially blocked in their elasticity. Thus, an intense stiffening of the of the total construction results in the upper region of the bonded bodies, where, in combination with the compression deformation of the lower material layers 30, 30', an extremely high resistance against deformation in the axial direction is established and an introduction of the tire bead 15, 15' into the drop center 16 can be securely prevented. Thus, detachment of the tire 34 need no longer be dreaded.

| List of Reference Characters | |
|---|---|
| 1 | Vehicle wheel |
| 2 | Emergency running support body |
| 3 | Shell-shaped ring body |
| 4, 5 | Support element |

-continued

| | List of Reference Characters |
|---|---|
| 6, 7 | Axially outer wall region of the ring body |
| 8 | Drop center rim |
| 9 | Rim flange diameter |
| 10–13 | Material layer |
| 10'–13' | Material layer |
| 14, 14' | Rim hump |
| 15, 15' | Tire bead |
| 16 | Drop rim |
| 17, 18 | Rim shoulder |
| 19 | Opening slot |
| 20, 20' | Parting lines |
| 21, 22 | Positive profile |
| 23, 24 | Negative profile |
| 25, 25' | Axially outer wall region |
| 26 | Shell-shaped ring body |
| 27, 27' | Upper material layer |
| 28, 28' | Support element |
| 29, 29' | Receiver |
| 30, 30' | Lower material layer |
| 31, 31' | Intermediate layer |
| 32, 32' | Connection region |
| 33 | Radial stressing |
| 34 | Tire |

What is claimed is:

1. A vehicle wheel and tire assembly comprising:
a wheel rim;
a pneumatic tire having a tread, two side walls and two beads, the pneumatic tire being mounted to the wheel rim;
an emergency running support body arranged within the pneumatic tire;
the emergency running support body comprising a ring-shaped body;
the ring-shaped body comprising a first axial outer wall region, a second axial outer wall region, and an emergency running support surface adapted to support the pneumatic tire in an emergency running condition;
a first ring-shaped support element arranged to radially support the first axial outer wall region;
a second ring-shaped support element arranged to radially support the second axial outer wall region;
wherein each of the first and the second ring-shaped support elements comprises a multi-layered structure, and
wherein layers of the multi-layered structure are radially arranged.

2. The vehicle wheel of claim 1, wherein the emergency running support body is shell-shaped.

3. The vehicle wheel of claim 1, wherein at least one of the first and the second ring-shaped support elements comprises at least three layers.

4. The vehicle wheel of claim 3, wherein at least one of the first and the second ring-shaped support elements comprises at least four layers.

5. The vehicle wheel of claim 1, wherein at least one of the first and the second ring-shaped support elements comprises at least one layer of one material and at least another layer of a different material.

6. The vehicle wheel of claim 1, wherein at least one of the first and the second ring-shaped support elements comprises at least one layer having an elasticity and at least another layer having a different elasticity.

7. The vehicle wheel of claim 1, wherein the multi-layered structure comprises at least two layers connected to each other.

8. The vehicle wheel of claim 1, wherein the first ring-shaped support element is connected to the first axial outer wall region and wherein the second ring-shaped support element is connected to the second axial outer wall region.

9. The vehicle wheel of claim 1, wherein the emergency running support surface is disposed between the first axial outer wall region and the second axial outer wall region.

10. The vehicle wheel of claim 1, wherein the ring-shaped body is slotted.

11. The vehicle wheel of claim 1, wherein the ring-shaped body comprises a separating slot.

12. The vehicle wheel of claim 1, wherein at least one of the first axial outer wall region and the second axial outer wall region comprises a receiver, the receiver being adapted to at least partially surround one of the first ring-shaped support element and the second ring-shaped support element.

13. The vehicle wheel of claim 1, wherein each of the first axial outer wall region and the second axial outer wall region comprises a receiver, each receiver being adapted to at least partially surround the first ring-shaped support element and the second ring-shaped support element.

14. The vehicle wheel of claim 13, wherein at least one layer of the multi-layered structure comprises an upper layer and wherein another layer of the multi-layered structure comprises a lower layer, whereby the upper layer has a lower elasticity than the lower layer.

15. The vehicle wheel of claim 13, wherein at least one layer of the multi-layered structure comprises an upper layer, wherein another layer of the multi-layered structure comprises a middle layer, and wherein another layer of the multi-layered structure comprises a lower layer, whereby the middle layer is arranged between the upper layer and the lower layer and whereby the upper layer has a lower elasticity than both the middle layer and the lower layer.

16. A vehicle wheel and tire assembly comprising:
a wheel rim;
a pneumatic tire having a tread, two side walls and two beads, the pneumatic tire being mounted to the wheel rim;
an emergency running support body arranged within the pneumatic tire;
the emergency running support body comprising a ring-shaped body;
the ring-shaped body comprising a first axial outer wall region, a second axial outer wall region, and an emergency running support surface adapted to support the pneumatic tire in an emergency running condition;
a first ring-shaped support element arranged to support the first axial outer wall region;
a second ring-shaped support element arranged to support the second axial outer wall region;
wherein at least one of the first and the second ring-shaped support elements comprises a multi-layered structure, and
wherein the ring-shaped body comprises a slot which is essentially axially oriented.

17. A vehicle wheel and tire assembly comprising:
a wheel rim;
a pneumatic tire having a tread, two side walls and two beads, the pneumatic tire being mounted to the wheel rim;
an emergency running support body arranged within the pneumatic tire;
the emergency running support body comprising a ring-shaped body;

the ring-shaped body comprising a first axial outer wall region, a second axial outer wall region, and an emergency running support surface adapted to support the pneumatic tire in an emergency running condition;

a first ring-shaped support element arranged to support the first axial outer wall region;

a second ring-shaped support element arranged to support the second axial outer wall region;

wherein at least one of the first and the second ring-shaped support elements comprises a multi-layered structure, and wherein at least one layer of the multi-layered structure comprises an upper layer and wherein at least another layer of the multi-layered structure comprises a lower layer, whereby the upper layer has a lower elasticity than the lower layer.

18. A vehicle wheel and tire assembly comprising:

a wheel rim;

a pneumatic tire having a tread, two side walls and two beads, the pneumatic tire being mounted to the wheel rim;

an emergency running support body arranged within the pneumatic tire;

the emergency running support body comprising a ring-shaped body;

the ring-shaped body comprising a first axial outer wall region, a second axial outer wall region, and an emergency running support surface adapted to support the pneumatic tire in an emergency running condition;

a first ring-shaped support element arranged to support the first axial outer wall region;

a second ring-shaped support element arranged to support the second axial outer wall region;

wherein at least one of the first and the second ring-shaped support elements comprises a multi-layered structure, and wherein at least one layer of the multi-layered structure comprises an upper layer, wherein at least another layer of the multi-layered structure comprises a middle layer, wherein at least another layer of the multi-layered structure comprises a lower layer, whereby the middle layer is arranged between the upper layer and the lower layer and whereby the upper layer has a lower elasticity than both the middle layer and the lower layer.

19. The vehicle wheel of claim 18, wherein the upper layer of the multi-layered structure is connected to the first axial outer wall region and wherein the lower layer engages a surface of the wheel rim.

20. The vehicle wheel of claim 18, wherein the upper layer of the multi-layered structure is connected to the second axial outer wall region and wherein the lower layer engages a surface of the wheel rim.

21. A vehicle wheel and tire assembly comprising:

a wheel rim;

a pneumatic tire having a tread, two side walls and two beads, the pneumatic tire being mounted to the wheel rim;

an emergency running support body arranged within the pneumatic tire;

the emergency running support body comprising a ring-shaped body;

the ring-shaped body comprising a first axial outer wall region, a second axial outer wall region, and an emergency running support surface adapted to support the pneumatic tire in an emergency running condition;

a first ring-shaped support element arranged to support the first axial outer wall region;

a second ring-shaped support element arranged to support the second axial outer wall region;

wherein at least one of the first and the second ring-shaped support elements comprises a multi-layered structure, and wherein at least one layer of the multi-layered structure comprises an upper layer, wherein at least another layer of the multi-layered structure comprises a middle layer, and wherein at least another layer of the multi-layered structure comprises a lower layer, whereby the middle layer is arranged between the upper layer and the lower layer and whereby each of the upper layer and the lower layer have a greater elasticity than the middle layer.

22. The vehicle wheel of claim 21, wherein the upper layer of the multi-layered structure is connected to the first axial outer wall region and wherein the lower layer engages a surface of the wheel rim.

23. The vehicle wheel of claim 21, wherein the upper layer of the multi-layered structure is connected to the second axial outer wall region and wherein the lower layer engages a surface of the wheel rim.

24. A vehicle wheel and tire assembly comprising:

a wheel rim;

a pneumatic tire having a tread, two side walls and two beads, the pneumatic tire being mounted to the wheel rim;

an emergency running support body arranged within the pneumatic tire;

the emergency running support body comprising a ring-shaped body;

the ring-shaped body comprising a first axial outer wall region, a second axial outer wall region, and an emergency running support surface adapted to support the pneumatic tire in an emergency running condition;

a first ring-shaped support element arranged to support the first axial outer wall region;

a second ring-shaped support element arranged to support the second axial outer wall region;

wherein at least one of the first and the second ring-shaped support elements comprises a multi-layered structure, and wherein at least one of the first ring-shaped support element and the second ring-shaped support element comprises an opening adapted to receive at least a portion of one of the first axial outer wall region and the second axial outer wall region.

25. The vehicle wheel of claim 24, wherein the opening adapted to receive at least a portion of one of the first axial outer wall region and the second axial outer wall region comprises at least one of a circumferential opening, an opening having a curved shape, and an opening having a negative profile.

26. The vehicle wheel of claim 24, wherein the opening adapted to receive at least a portion of one of the first axial outer wall region and the second axial outer wall region comprises an opening having a negative profile, the negative profile being adapted to receive a positive profile of at least one of the first axial outer wall region and the second axial outer wall region.

27. A vehicle wheel and tire assembly comprising:

a wheel rim;

a pneumatic tire having a tread, two side walls and two beads, the pneumatic tire being mounted to the wheel rim;

an emergency running support body arranged within the pneumatic tire;

the emergency running support body comprising a ring-shaped body;

the ring-shaped body comprising a first axial outer wall region, a second axial outer wall region, and an emergency running support surface adapted to support the pneumatic tire in an emergency running condition;

a first ring-shaped support element arranged to support the first axial outer wall region;

a second ring-shaped support element arranged to support the second axial outer wall region;

wherein at least one of the first and the second ring-shaped support elements comprises a multi-layered structure, and wherein the first ring-shaped support element comprises a first opening adapted to receive at least a portion of the first axial outer wall region and wherein the second ring-shaped support element comprises a second opening adapted to receive at least a portion of the second axial outer wall region.

28. The vehicle wheel of claim 27, wherein at least one of the first and the second openings is at least one of a circumferential opening, a curved-shaped opening, and a negative profile.

29. The vehicle wheel of claim 27, wherein each of the first opening and the second opening have a negative profile, each negative profile being adapted to receive a corresponding positive profile of the first axial outer wall region and the second axial outer wall region.

30. A vehicle wheel and tire assembly comprising:

a wheel rim;

a pneumatic tire having a tread, two side walls and two beads, the pneumatic tire being mounted to the wheel rim;

an emergency running support body arranged within the pneumatic tire;

the emergency running support body comprising a ring-shaped body;

the ring-shaped body comprising a first axial outer wall region, a second axial outer wall region, and an emergency running support surface adapted to support the pneumatic tire in an emergency running condition;

a first ring-shaped support element arranged to support the first axial outer wall region;

a second ring-shaped support element arranged to support the second axial outer wall region;

wherein at least one of the first and the second ring-shaped support elements comprises a multi-layered structure, and wherein the multi-layered structure comprises at least an upper layer and at least a lower layer, the upper layer including plastic and the lower layer including rubber.

31. A vehicle wheel and tire assembly comprising:

a wheel rim;

a pneumatic tire having a tread, two side walls and two beads, the pneumatic tire being mounted to the wheel rim;

an emergency running support body arranged within the pneumatic tire;

the emergency running support body comprising a ring-shaped body;

the ring-shaped body comprising a first axial outer wall region, a second axial outer wall region, and an emergency running support surface adapted to support the pneumatic tire in an emergency running condition;

a first ring-shaped support element arranged to support the first axial outer wall region;

a second ring-shaped support element arranged to support the second axial outer wall region;

wherein at least one of the first and the second ring-shaped support elements comprises a multi-layered structure, and wherein the multi-layered structure comprises at least an upper layer, at least a middle layer, and at least a lower layer, whereby the upper layer and the lower layer includes rubber, and the middle layer includes plastic.

32. A vehicle wheel and tire assembly comprising:

a wheel rim;

a pneumatic tire having a tread, two side walls and two beads, the pneumatic tire being mounted to the wheel rim;

an emergency running support body arranged within the pneumatic tire;

the emergency running support body comprising a ring-shaped body;

the ring-shaped body comprising a first axial outer wall region, a second axial outer wall region, and an emergency running support surface adapted to support the pneumatic tire in an emergency running condition;

a first ring-shaped support element arranged to support the first axial outer wall region;

a second ring-shaped support element arranged to support the second axial outer wall region;

wherein at least one of the first and the second ring-shaped support elements comprises a multi-layered structure, and wherein the emergency running support body comprises a shell-shaped structure having at least two outwardly curved surfaces and at least one inwardly curved surface arranged therebetween.

33. A vehicle wheel and tire assembly comprising:

a wheel rim;

a pneumatic tire having a tread, two side walls and two beads, the pneumatic tire being mounted to the wheel rim;

an emergency running support body arranged within the pneumatic tire;

the emergency running support body comprising a ring-shaped body;

the ring-shaped body comprising a first axial outer wall region, a second axial outer wall region, and an emergency running support surface adapted to support the pneumatic tire in an emergency running condition;

a first ring-shaped support element arranged to radially support the first axial outer wall region;

a second ring-shaped support element arranged to radially support the second axial outer wall region;

each of the first and the second ring-shaped support elements comprising at least two layers having different elasticity, and wherein the layers of the at least two layers are radially arranged.

34. A vehicle wheel and tire assembly comprising:

a wheel rim;

a pneumatic tire having a tread, two side walls and two beads, the pneumatic tire being mounted to the wheel rim;

an emergency running support body arranged within the pneumatic tire;

the emergency running support body comprising a ring-shaped body;

the ring-shaped body comprising a first axial outer wall region, a second axial outer wall region, and an emergency running support surface adapted to support the pneumatic tire in an emergency running condition;

a first ring-shaped support element arranged to radially support the first axial outer wall region;

a second ring-shaped support element arranged to radially support the second axial outer wall region;

each of the first and the second ring-shaped support elements comprising at least two layers made of different materials, and wherein the layers of the at least two layers are radially arranged.

* * * * *